US012681145B2

(12) United States Patent (10) Patent No.: US 12,681,145 B2

Himmler et al. (45) Date of Patent: Jul. 14, 2026

(54) TEST ASSEMBLY AND METHOD FOR TESTING A RADAR SENSOR

(71) Applicant: dSPACE GmbH, Paderborn (DE)

(72) Inventors: Andreas Himmler, Paderborn (DE); Jeffrey Paul, Torrance, CA (US); Jonathan Watkins, Los Angeles, CA (US)

(73) Assignee: dSPACE SE & Co. KG, Paderborn (DE)

( * ) Notice: Subject to any disclaimer, the term of this patent is extended or adjusted under 35 U.S.C. 154(b) by 323 days.

(21) Appl. No.: 18/503,211

(22) Filed: Nov. 7, 2023

(65) Prior Publication Data

US 2025/0147150 A1 May 8, 2025

(51) Int. Cl.
 *G01S 7/40* (2006.01)
 *G01S 13/931* (2020.01)

(52) U.S. Cl.
 CPC .......... *G01S 7/4086* (2021.05); *G01S 7/4056* (2013.01); *G01S 13/931* (2013.01)

(58) Field of Classification Search
 CPC ..... G01S 7/4086; G01S 7/4056; G01S 13/931
 See application file for complete search history.

(56) References Cited

U.S. PATENT DOCUMENTS

| | | | |
|---|---|---|---|
| 5,721,554 A | 2/1998 | Hall et al. | |
| 10,520,586 B2 * | 12/2019 | Haghighi | .............. G01S 7/4056 |
| 2021/0382165 A1 * | 12/2021 | Choi | ....................... G01S 7/354 |

OTHER PUBLICATIONS

KR 20190135716 A (Dec. 2019).*
Axel Diewald et al: "Two-Dimensional Arbitrary Angle of Arrival in Radar Target Simulation", Arxiv.Org, Cornell University Library, Feb. 7, 2022 (Feb. 7, 2022), pp. 1-5, 201 Olin Library Cornell University Ithaca, NY14853, XP091151100.

* cited by examiner

*Primary Examiner* — Resha Desai
*Assistant Examiner* — Helena H Seraydaryan
(74) *Attorney, Agent, or Firm* — Leydig, Voit & Mayer, Ltd.

(57) ABSTRACT

A test assembly for testing a radar sensor includes: a receptacle for the radar sensor, wherein the radar sensor is configured to transmit a radar signal; at least one receive antenna configured to receive the radar signal; at least two transmit antennas each configured to transmit one reflection signal, wherein a superposition signal, which is a superposition of the reflection signals is receivable by the radar sensor; and a computer configured to ascertain at least one parameter of the respective reflection signals on the basis of the received radar signal. The test assembly comprises more transmit antennas than receive antennas.

18 Claims, 3 Drawing Sheets

TEST ASSEMBLY AND METHOD FOR TESTING A RADAR SENSOR

TECHNICAL FIELD

The application relates to a test assembly for testing a radar sensor and to a method for testing a radar sensor using a test assembly of this kind.

BACKGROUND

Vehicles having advanced driver assistance systems (ADAS), e.g., for autonomous or semi-autonomous driving, can comprise various environment sensors for capturing environments, such as radar sensors, ultrasonic sensors, LiDAR sensors, and/or cameras.

One option for testing environment sensors, e.g., radar sensors, for vehicles is to test the corresponding sensors once in the installed state, as part of test journeys. This is complex and expensive.

A test assembly can assist in the development of environment sensors, e.g., radar sensors, via functional tests, for example. In this case, the test assembly can simulate the operation of the environment sensors under various environmental or usage conditions.

SUMMARY

In an exemplary embodiment, the present invention provides a test assembly for testing a radar sensor. The test assembly includes: a receptacle for the radar sensor, wherein the radar sensor is configured to transmit a radar signal; at least one receive antenna configured to receive the radar signal; at least two transmit antennas each configured to transmit one reflection signal, wherein a superposition signal, which is a superposition of the reflection signals is receivable by the radar sensor; and a computer configured to ascertain at least one parameter of the respective reflection signals on the basis of the received radar signal. The test assembly comprises more transmit antennas than receive antennas.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
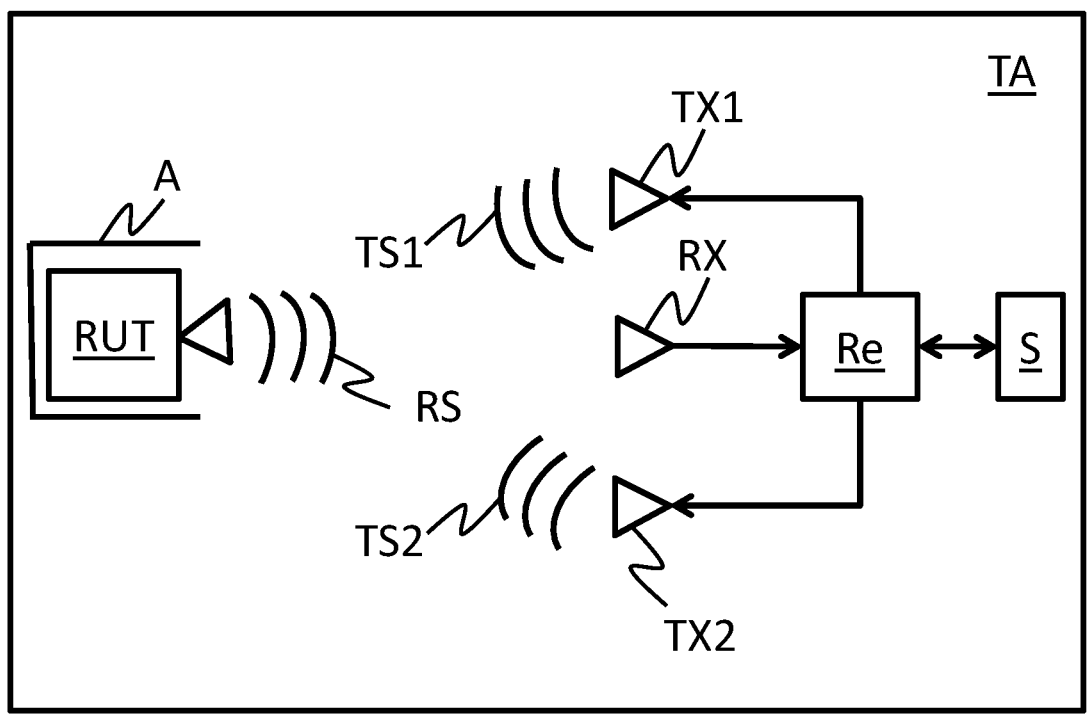
FIG. 1 is a block diagram of a test assembly according to the invention.

A test assembly for testing a radar sensor comprises:
a receptacle for the radar sensor, wherein the radar sensor is configured to transmit a radar signal, at least one receive antenna, which is configured to receive the radar signal,
at least two transmit antennas, which are configured to each transmit one reflection signal,
wherein a superposition signal, which is a superposition of the reflection signals, can be
received by the radar sensor, wherein a first number of the at least one receive antenna is less than a second number of the at least two transmit antennas,
a computer, which is configured to ascertain at least one parameter of the respective reflection signals on the basis of the received radar signal.

By using this test assembly, a flexible test environment can be provided for testing the radar sensor in that reflection signals that simulate test objects determined via the superposition signal are transmitted by the at least two transmit antennas. In this case, the reflection signals and the resulting superposition signal are as if the radar signal had been reflected by these test objects or the test object. Here, the computer ascertains at least one parameter of the reflection signals on the basis of the radar signal and other data which describe the test object(s), for example.

Because the first number of the receive antennas is less than the second number of the at least two transmit antennas, the outlay involved in a complex test environment of this kind is reduced.

A method for testing a radar sensor using the test assembly comprises:
transmitting a radar signal by the radar sensor arranged in a receptacle,
receiving the radar signal by at least one receive antenna,
sending one reflection signal each to the radar sensor by at least two transmit antennas,
wherein a first number of the at least one receive antenna is less than a second number of the at least two transmit antennas,
receiving a superposition signal, which is composed of the reflection signals, by the radar sensor,
wherein at least one parameter of the reflection signal in question is ascertained by a computer on the basis of the received radar signal.

At least one parameter of a particular reflection signal is ascertained by the computer using the received radar signal. To do this, other data can optionally be taken into account. The at least one parameter of the particular reflection signal ascertained by the computer can be the amplitude, the delay, or the Doppler frequency, for example. The other signal parameters, such as the signal frequency or signal shape, can then correspond to that of the received radar signal, for example. However, a phase position of the reflection signal in question can also be determined by the computer as if the radar signal had been reflected by a test object. As a result, for example for predetermined objects (also called test objects or environmental objects) which lie in the environment or field of view of the radar sensor, the corresponding reflection signals may be sent via the transmit antennas. The test assembly thus provides one or more predetermined test objects electronically to the radar sensor for capturing. The object(s) then does/do not have to actually be present, but instead can be virtually simulated via the corresponding reflection signals.

Particularly for autonomous or semi-autonomous driving of vehicles, it is necessary to confront the radar sensor with a very wide range of objects in order to establish whether these objects can be recognized by the radar sensor so that safe automated or autonomous driving is possible.

The test assembly comprises mechanical and electrical components which make it possible to test the radar sensor in a defined environment, in particular a virtual environment. In this way, many tests can be performed virtually, and then no test journeys, or at least only a few test journeys, are required for these, for example when the radar sensor is applied in vehicles.

The test assembly comprises the receptacle for the radar sensor, which receptacle makes it possible to place the radar sensor in a defined manner. In this case, a space is provided for the radar sensor, into which the radar signal is then transmitted by the radar sensor. This space can be defined by walls; however, it can also be an open space.

The receptacle, which mechanically and electrically connects the radar sensor to the test assembly, can be an adapter, which makes it possible to install different radar sensors in the test assembly. In this case, different receptacles can accordingly be provided and used for many different radar sensors. The radar sensor can in particular be an FMCW radar in which frequency modulation with a continuous signal or a continuous wave signal is used. A radar sensor having a different modulation process may also be used.

The radar signal is therefore the signal that the radar sensor transmits in order to recognize objects in its environment.

The test assembly comprises at least one receive antenna, which is configured to receive the radar signal. A receive antenna of this kind can, for example, be configured to receive signals from all possible directions. It can, however, also be configured to receive signals only from certain sections of the environment. This also applies to the at least two transmit antennas, the reflection signals from which together form the superposition signal, which is received by the radar sensor. That is to say, the transmit antennas can also optionally emit the reflection signals only in certain directions.

The test assembly and the method thus have the advantage that the number of receive antennas of the test assembly can be less than the number of transmit antennas. There are thus more transmit antennas than receive antennas and they can be distributed in the space, e.g., in the form of a two-dimensional array. Therefore, complex scenarios having a plurality of spatially distributed objects for the radar sensor can also be simulated. For example, a virtual pixel wall having virtual image points, called pixels, can be implemented by the test assembly, in which case the individual virtual pixels are simulated by the superposition of the reflection signals for the radar sensor. The number of transmit antennas can be increased while the number of receive antennas can be kept low. The objects in the scenarios can thus be simulated via the virtual pixel wall.

Furthermore, the computer is provided, which ascertains at least one parameter for the respective reflection signals from an operating signal derived from the received radar signal. If the computer knows the received radar signal and the object(s) that are intended to be simulated, or their spatial arrangement, the reflection signals can then be accordingly determined. The computer can be an assembly that comprises one or more processors, and optionally also different types of processors for signal processing.

The same applies to the method performed by the test assembly.

The computer may be configured to ascertain respective amplitudes of the respective reflection signals as parameters such that the direction from which the superposition signal can be received by the radar sensor can be determined from the amplitude ratio. That is to say, the direction from which the superposition signal can be received by the radar sensor results from the ratio of the amplitudes of the respective reflection signals. This is a virtual direction determined by the reflection signals via their amplitudes. In other words, the starting point from which the superposition signal can be received is a virtual position. An antenna does not have to be provided here. A simulation of this kind can also be called an angle of arrival (AoA) simulation.

In embodiments, the at least two transmit antennas can be the same distance from the radar sensor. If the radar sensor comprises one transmit/receive antenna, the distance between the at least two transmit antennas and the one transmit/receive antenna can be the same. If the radar sensor comprises more than one transmit/receive antenna, the distance between the at least two transmit antennas and a central point between the plurality of transmit/receive antennas can be the same. If the radar sensor comprises a transmit antenna that is separate from the receive antenna, the distance between the at least two transmit antennas of the test assembly and the one receive antenna of the radar sensor can be the same. If the radar sensor comprises a plurality of separate transmit antennas, the distance between the at least two transmit antennas of the test assembly and a central point between the plurality of receive antennas of the radar sensor can be the same.

Furthermore, an environment which can be captured by the radar sensor can be simulated by the superposition signal. That is to say, the superposition signal provides the radar sensor with a predetermined environment containing simulated objects.

In one embodiment, the simulated environment comprises one or more objects which can be captured by the radar sensor. Therefore, not only the spatial extent of one object but also a plurality of objects can be simulated via the reflection signals.

In this case, the environment may be simulated in such a manner as to change over time. That is to say, the environment characterized by the objects can change over time, because, for example, the objects themselves are moving or the radar sensor is also moving relative to the objects. Objects can also disappear or new ones can emerge.

Furthermore, the computer may be configured to ascertain the at least one parameter of the respective reflection signals on the basis of stored data, wherein the stored data comprise information on the simulatable environment. Therefore, by way of the stored data, information regarding the, e.g., spatial extent of the objects or their radar cross section, etc., can be used to determine the reflection signals.

Furthermore, the computer may be configured to ascertain the at least one parameter of the respective reflection signals on the basis of received data. For example, data can be sent by a user to the computer so that certain objects are then simulated. This can be done in an automated manner, for example depending on which objects the radar sensor recognizes. A program on the test assembly and/or a program running externally could respond to this by a simulated vehicle that communicates with the radar sensor simulating a braking process or responding in another way. This response can be received by the computer as a response signal and can feed into the simulation of the objects.

The program running on the test assembly and/or externally may recognize that the radar sensor is only poorly capturing certain objects. More of these objects can then be provided for this purpose in order to analyze this behavior of the radar sensor more accurately. Artificial intelligence may also be used in the present case.

Furthermore, the test assembly may be designed such that the reflection signals are transmitted by pairs of two transmit antennas each. By using a pair of transmit antennas, a desired superposition signal can be interpolated via the configuration of the two reflection signals. The pairs of two transmit antennas in each case can in particular be pairs of adjacent transmit antennas. This can further simplify the method for generating a desired direction for the superposition signal. More than one pair of transmit antennas may be used, for example a plurality of pairs, in order to generate more complex situations or test environments for the radar sensor. In this case, an entire antenna array of transmit antennas may be used, for example. This antenna array of transmit antennas can then interact with a single receive antenna of the test assembly, for example, in order to simulate an entire environment scenario containing one, several, or many objects.

It has proven advantageous for there to be a distance of half a wavelength between adjacent antennas. In a development, the transmit antennas may be arranged over certain angular distances, for example +/−8°, +/−25°, and +/−45°, the number of degrees being indicated in relation to a position directly opposite the radar sensor. This position opposite the radar sensor is to be denoted by 0°. A single receive antenna is provided at 0° in comparison with the arrangement of the radar sensor.

In addition, the computer is configured to ascertain the phase position as a parameter of the respective reflection signals. The phase position of the reflection signal in question determines the resulting phase position of the superposition signal in accordance with the superposition principle. In this case, the computer can be configured to ascertain the phase position such that it is the same for the respective reflection signals that form the superposition signal. At the same phase position, the direction of the superposition signal can be particularly precisely and reliably brought about by influencing the amplitude.

In one embodiment, the computer is configured to transfer the reflection signals, which are to be transmitted, to the respective transmit antennas. In this case, by way of a frequency conversion, the computer can raise the reflection signals to the transmit frequency and transfer them to the transmit antennas for sending.

In addition, the computer may be configured to take into account a signal path between the computer and the transmit antenna in question when ascertaining the parameters. For radio-frequency signals, the signal path on the radio-frequency side plays an important role. This signal path should be such that the reflection signals are sent in the various transmit antennas at a predetermined point in time with predetermined parameters and, in particular, an undesirable delay and/or parameter changes are brought about by different signal paths. This relates in particular to the phase position of the reflection signals to be transmitted, for example.

FIG. 1 is a block diagram of the test assembly TA, which comprises a receptacle A, transmit antennas TX1, TX2, a receive antenna RX, a computer Re, and a memory S. A radar sensor RUT is arranged in a receptacle A and is mechanically and electrically connected to the test assembly TA via the receptacle A. The radar sensor RUT can be tested, in particular with regard to its functionality, via the test assembly TA.

Via an antenna, the radar sensor RUT sends a radar signal RS, which is received by the receive antenna RX of the test assembly TA. The antenna of the radar sensor RUT may be used to transmit the radar signal RS and to receive signals.

Alternatively, the radar sensor RUT may comprise a transmit antenna for transmitting the radar signal RS and a receive antenna for receiving signals.

The signal received by the test assembly TA via the receive antenna RX or a signal derived therefrom reaches the computer Re, which is connected to a memory S via an input/output interface in order to store or buffer data and/or to load it for further processing. The memory S is an electronic memory, for example. However, other memory technology may also be used.

From the radar signal RS, the computer Re determines parameters of reflection signals TS1, TS2 to be transmitted via the transmit antennas TX1, TX2. The parameters determined by the computer Re can be an amplitude of the respective reflection signals TS1, TS2, for example. The parameters of the reflection signals TS1, TS2 can optionally be determined using data from the memory S. The reflection signals TS1, TS2 are sent via the transmit antennas TX1, TX2. These reflection signals TS1, TS2 are superposed in accordance with the superposition principle and together form a superposition signal, which the radar sensor RUT receives. The superposition signal is received by the radar sensor RUT and is perceived as a simulated reflection of the radar signal RS.

The computer Re itself has a radio-frequency circuit portion, which generates the reflection signals TS1 and TS2. This radio-frequency circuit portion is fed with baseband signals that are generated by the computer Re and are then converted to an intermediate frequency. The radio-frequency signals TS1 and TS2 are then generated, for sending, from the intermediate frequency signals via a frequency conversion.

An amplitude ratio of the respective amplitudes of the reflection signals TS1 and TS2 determines the direction from which the superposition signal appears to come from the standpoint of the radar sensor RUT. This makes it possible to simulate certain environment scenarios for the radar sensor RUT. The environment scenarios can be contained in the data stored in the memory S, for example. The objects provided in the environment scenarios can then be simulated via their reflection in the radar signal RS for the radar sensor RUT, for example.

The test environment thus provides a simple option for simulating a complex environment for the radar sensor RUT. The test assembly TA may be equipped with a number of transmit antennas TX1, TX2 that is lower than the number of receive antennas RX1, RX2 and to still be able to simulate complex environment scenarios. The number of transmit antennas TX1, TX2 may be reduced by using the properties of the superposition of the reflection signals TS1, TS2. These properties of the superposition signal are influenced by the selection of the parameters of the respective reflection signals TS1, TS2.

As a result, the test assembly TA can be designed in a simpler and more cost-effective manner for testing the functioning of the radar sensor RUT. Since many vehicles already comprise radar sensors RUT for capturing the environment, extremely simple yet still comprehensive testing of the radar sensors RUT via test assemblies TA of this kind is advantageous.

Figure 2:
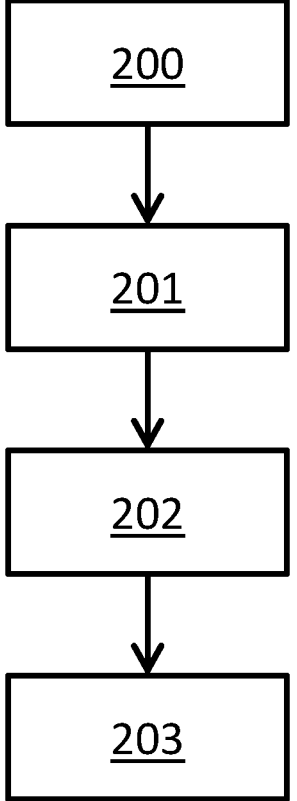
FIG. 2 is a flowchart of a method.

FIG. 2 shows the method that is performed on the test assembly TA. In method step 200, the radar signal RS is transmitted by the radar sensor RUT arranged in the receptacle A. In this case, the so-called FMCW Doppler radar method can be used. That is to say, the Doppler effect in relation to a frequency shift is utilized.

In method step 201, the radar signal RS is received by at least one receive antenna RX of the test assembly TA. The transmitted radar signal RS and the radar signal received by the receive antenna RX differ at least on account of the amplitudes, since the radar signal RS will undergo attenuation on the path between the radar sensor RUT and the receive antenna RX. In the test assembly, however, the distances are short, and therefore, in the present case, for the sake of simplicity, the transmitted radar signal RS and the received radar signal RS are denoted by the same reference sign, RS. The same applies to the reflection signals TS1 and TS2.

The computer Re determines the reflection signals TS1 and TS2 from the received radar signal RS. This can be carried out using data from the memory S, for example. The signal processing in the computer Re is carried out in the baseband range using an intermediate frequency. Signal processing in the radio-frequency range, which would be very complex in terms of electronics, can thus be avoided. Accordingly, for the generation of the reflection signals TS1, TS2, the radio-frequency signal is generated from a baseband signal using an intermediate frequency.

In method step 202, the reflection signal in question is then sent to the radar sensor RUT by the at least two transmit antennas TX1 and TX2. Because just one receive antenna RX is used, by way of example, the complexity of the test assembly TA can be reduced. The number of receive antennas RX can be selected to be less than the number of transmit antennas TX1 and TX2. The transmit antennas TX1 and TX2 can, for example, always be actuated in pairs, such that the two transmit antennas TX1, TX2 always generate the superposition signal in pairs. Exemplary configurations can, for example, comprise one receive antenna RX and two, four, six, or more transmit antennas TX1, TX2.

In method step 203, the superposition signal, which is composed of the reflection signals TS1 and TS2, is received by the radar sensor RUT. This superposition signal is then analyzed by the signal processing of the radar sensor RUT. The radar sensor RUT can optionally carry out object recognition.

Using the test assembly TA, an extended simulation may be carried out in which a response signal, as a response to the superposition signal, is again transferred to the computer Re, which responds to the received response signal in the environment scenario by changing the environment scenario, for example. This change to the environment scenario can then be found again in the superposition signal.

Figure 3:
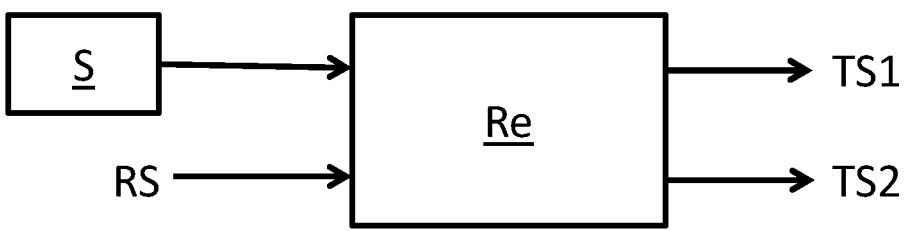
FIG. 3 is a block diagram of input and output data of a computer.

FIG. 3 is a block diagram of exemplary communication relationships of the computer Re, in particular in relation to data and incoming and outgoing signals. This computer can also be a further computer in addition to the computer described in FIG. 1. The radar signal RS or a signal derived therefrom is first received by the computer Re. The computer Re outputs the reflection signals TS1 and TS2 as a response to this radar signal RS. In this case, the reflection signals TS1, TS2 can be based on data from the memory S, which can in particular be based on the environment scenario. In this case, the environment scenario can change on the basis of the behavior of the radar sensor RUT. For example, the radar sensor RUT may have responded to the environment scenario presented to it via the reflection signals TS1, TS2, e.g., by initiating braking of the vehicle. This response by the radar sensor RUT can be taken into account in the environment scenario by the data in the memory S changing on the basis of this response. The transmitted reflection signals TS1, TS2 can then reflect this change in the underlying relative speed between the radar sensor RUT and the environment, for example.

Figure 4:
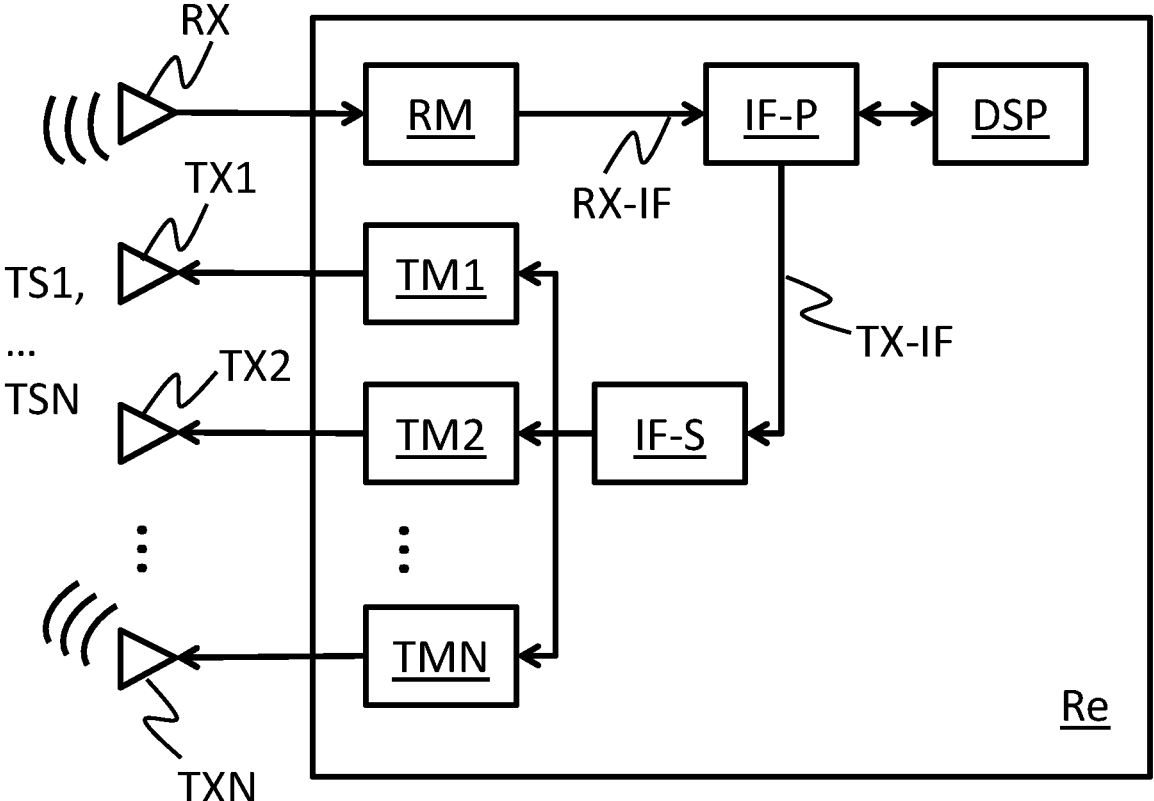
FIG. 4 is a block diagram of a computer with connected antennas.

FIG. 4 is a block diagram of an exemplary structure of the computer Re. The radar signal RS is transmitted to the receive module RM by the receive antenna RX. The receive module RM downmixes the radar signal RS to an intermediate frequency to form the intermediate frequency radar signal RX-IF. The intermediate frequency radar signal RX-IF is then processed by the intermediate frequency processor IF-P. The intermediate frequency processor IF-P generates the baseband signal, which is output to a digital signal processor DSP.

The digital signal processor DSP determines what the superposition signal to be received by the radar sensor RUT would look like for a predetermined object in the environment scenario. From this, the signal processor DSP ascertains what the corresponding reflection signals TS1-TSN, of which the superposition signal is composed, would look like at the locations of the transmit antennas TX1 to TXN. The digital signal processor DSP then derives from this the corresponding parameters of the reflection signals TS1, TS2 to TSN. After generating the reflection signals TS1, TS2 to TSN in the baseband, the intermediate frequency processor IF-P then generates the intermediate frequency reflection signal TX-IF. This intermediate frequency reflection signal TX-IF reaches a power divider IF-LS, which divides the intermediate frequency reflection signal TX-IF between transmit modules TM1 to TMN.

The particular reflection signal TS1, TS2 to TSN is generated in the transmit modules TM1 to TMN by upmixing the intermediate frequency reflection signal TX-IF to the radio frequency. The reflection signals TS1-TSN are then sent via the transmit antennas TX1 to TXN, provided that they are actuated.

Figure 5:
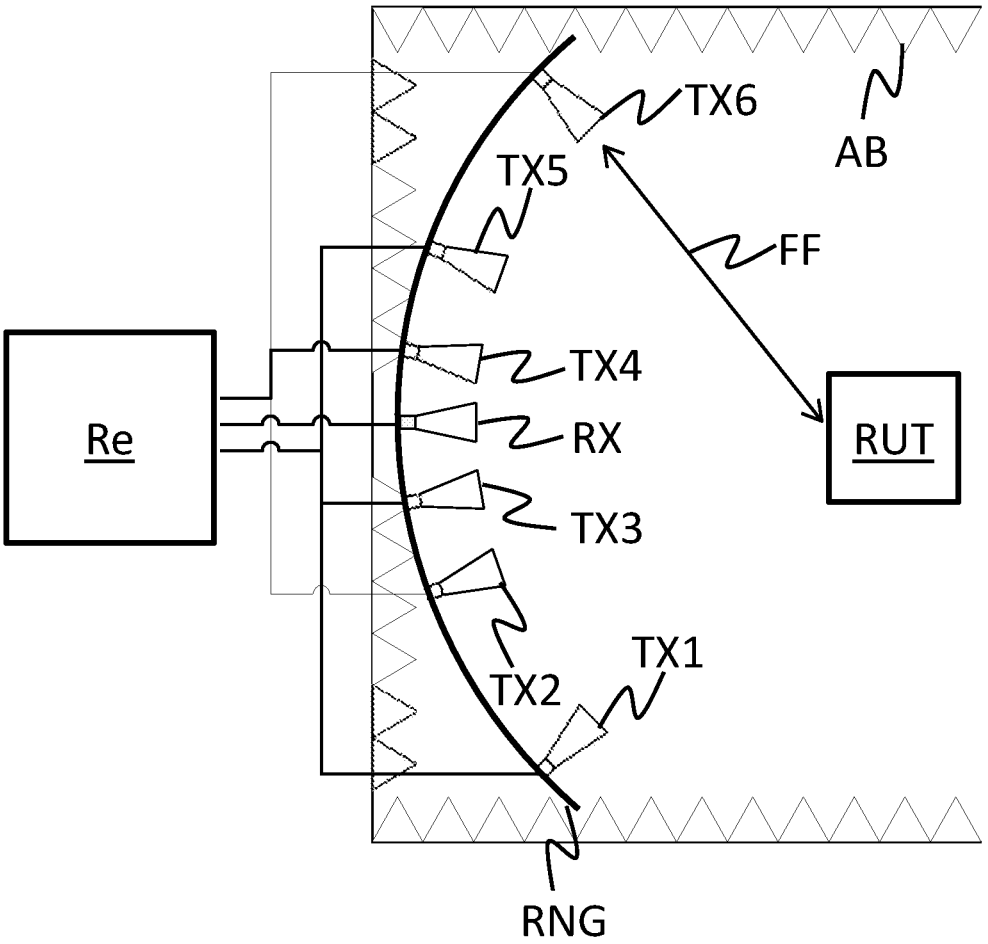
FIG. 5 is a further block diagram of a test assembly.

FIG. 5 is a block diagram of a configuration of the transmit antennas TX1 to TX6 in a space, e.g. a chamber delimited by walls, of the test assembly TA. The walls of the chamber are equipped with absorbers AB. Via the absorbers AB, undesired reflections on the walls of the chamber are largely suppressed.

The transmit antennas TX1 to TX6 are arranged on an annular holder RNG, such that they are substantially the same distance FF from the radar sensor RUT. In this case, the distance from the radar sensor RUT can refer to the transmit/receive antenna of the radar sensor RUT, for example. If the radar sensor RUT comprises a plurality of receive antennas, the distance FF can refer to the midpoint between this plurality of receive antennas of the radar sensor RUT.

As shown, the transmit antennas TX1, TX2, TX3, TX4, TX5, and TX6 can optionally be arranged at different angles, and preferably symmetrically with the receive antenna RX. In this case, for example, the receive antenna RX can be arranged at 0°, i.e. can be arranged opposite the radar sensor RUT.

The computer Re obtains the received radar signal RS via the receive antenna RX and emits the reflection signals TS1 to TS6, which are to be transmitted, to the respective individual transmit antennas TX1 to TX6, as described above. In this case, it is possible that, sometimes, not all the transmit antennas TX1 to TX6 are actuated. For example, each of the transmit antennas TX1 to TX6 may be actuated in pairs. The pairs of transmit antennas TX1 to TX6 assigned to one another can be permanently assigned or can each be assigned to one another dynamically depending on the superposition signal to be attained.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

RUT Radar sensor
TA Test assembly
A Receptacle
RS Radar signal
RX Receive antenna
TX1, TX2, . . . , TXN Transmit antenna
TS1, TS2, . . . , TSN Reflection signal
Re Computer
S Memory
200-204 Method steps
RX-IF Intermediate frequency radar signal
IF-P Intermediate frequency processor
IF-S Power divider
TX-IF Intermediate frequency reflection signal
TM1, TM2, . . . , TMN Transmit module
RM Receive module
DSP Digital signal processor
AB Absorber
FF Distance
RNG Annular holder

The invention claimed is:

1. A test assembly for testing a radar sensor, comprising:
a receptacle in which the radar sensor is disposed, wherein the radar sensor is configured to transmit a radar signal;
at least one receive antenna configured to receive the radar signal;
at least two transmit antennas each configured to transmit one reflection signal, wherein a superposition signal, which is a superposition of the reflection signals is receivable by the radar sensor, wherein the test assembly comprises more transmit antennas than receive antennas; and
a computer configured to:

ascertain, based on the received radar signal, at least one parameter of respective reflection signals to be transmitted by the at least two transmit antennas, wherein ascertaining the at least one parameter of the respective to-be-transmitted reflection signals comprises ascertaining respective amplitudes of the respective to-be-transmitted reflection signals, wherein an amplitude ratio of the respective amplitudes simulates an antenna being provided at a virtual position and a virtual direction from which the superposition signal is received by the radar sensor; and
transfer the respective to-be-transmitted reflection signals to the at least two transmit antennas;
wherein ascertaining the at least one parameter of the respective to-be-transmitted reflection signals takes into account respective signal paths between the computer and respective transmit antennas.

2. The test assembly according to claim 1, wherein the superposition signal is capable of simulating an environment capturable by the radar sensor.

3. The test assembly according to claim 2, wherein the simulatable environment comprises one or more objects capturable by the radar sensor.

4. The test assembly according to claim 2, wherein the environment is capable of being simulated in such a manner as to change over time.

5. The test assembly according to claim 2, wherein the computer is configured to ascertain the at least one parameter of the respective to-be-transmitted reflection signals on the basis of stored data, wherein the stored data comprise information on the simulatable environment.

6. The test assembly according to claim 2, wherein the computer is configured to ascertain the at least one parameter of the respective to-be-transmitted reflection signals on the basis of received data.

7. The test assembly according to claim 1, wherein the test assembly is configured such that each of the reflection signals are transmitted by a respective pair of two adjacent transmit antennas.

8. The test assembly according to claim 1, wherein the computer is configured to ascertain a phase position as a parameter of the respective to-be-transmitted reflection signals.

9. The test assembly according to claim 8, wherein the computer is configured to ascertain the phase position such that the ascertained phase position is the same for the to-be-transmitted respective to-be-transmitted reflection signals.

10. The test assembly according to claim 1, wherein taking into account respective signal paths between the computer and respective transmit antennas relates to phase positions of the respective to-be-transmitted reflection signals.

11. A method for testing a radar sensor, comprising:
transmitting, by the radar sensor, a radar signal, wherein the radar sensor is disposed in a receptacle;
receiving, by at least one receive antenna, the radar signal;
ascertaining, by a computer, based on the received radar signal, at least one parameter of respective reflection signals to be transmitted by the at least two transmit antennas, wherein ascertaining the at least one parameter of the respective to-be-transmitted reflection signals comprises ascertaining respective amplitudes of the respective to-be-transmitted reflection signals, wherein an amplitude ratio of the respective amplitudes simulates an antenna being provided at a virtual position and a virtual direction from which a superposition signal is received by the radar sensor, and wherein ascertaining the at least one parameter of the respective to-be-transmitted reflection signals takes into account respective signal paths between the computer and respective transmit antennas;

transferring, by the computer, the respective to-be-transmitted reflection signals to the at least two transmit antennas;

transmitting, by each of at least two transmit antennas, one reflection signal to the radar sensor, wherein a quantity of receive antennas corresponding to the at least one receive antenna is less than a quantity of transmit antennas corresponding to the at least two transmit antennas, and wherein the transmitted reflection signals form the superposition signal; and receiving, by the radar sensor, the superposition signal.

12. The method according to claim 11, wherein an environment which is capturable by the radar sensor is simulated by the superposition signal.

13. The method according to claim 12, wherein the simulated environment comprises one or more objects which are capturable by the radar sensor.

14. The method according to claim 12, wherein the environment is simulated in such a manner as to change over time.

15. The method according to claim 11, wherein the computer ascertains the at least one parameter of the respective to-be-transmitted reflection signals on the basis of stored data, wherein the stored data comprise information on the simulated environment.

16. The method according to claim 11, wherein the computer ascertains the at least one parameter of the respective to-be-transmitted reflection signals on the basis of received data.

17. The method according to claim 11, wherein the computer ascertains a phase position as a parameter of the respective to-be-transmitted reflection signals.

18. The method according to claim 17, wherein the transmitted reflection signals are transmitted at the same phase position.

* * * * *